United States Patent
Zhou et al.

(10) Patent No.: US 10,026,134 B2
(45) Date of Patent: Jul. 17, 2018

(54) CHARGING AND DISCHARGING SCHEDULING METHOD FOR ELECTRIC VEHICLES IN MICROGRID UNDER TIME-OF-USE PRICE

(71) Applicant: Hefei University of Technology, Hefei, Anhui Province (CN)

(72) Inventors: Kaile Zhou, Hefei (CN); Xinhui Lu, Hefei (CN); Shanlin Yang, Hefei (CN); Li Sun, Hefei (CN); Chi Zhang, Hefei (CN); Zhen Shao, Hefei (CN)

(*) Notice: Subject to any disclaimer, the term of this patent is extended or adjusted under 35 U.S.C. 154(b) by 0 days.

(21) Appl. No.: 15/597,598

(22) Filed: May 17, 2017

(65) Prior Publication Data

US 2017/0337646 A1    Nov. 23, 2017

(30) Foreign Application Priority Data

May 19, 2016   (CN) .......................... 2016 1 0347527

(51) Int. Cl.
*B60L 11/18*     (2006.01)
*G06Q 50/06*     (2012.01)
*G06Q 10/06*     (2012.01)

(52) U.S. Cl.
CPC .......... *G06Q 50/06* (2013.01); *B60L 11/1824* (2013.01); *B60L 11/1861* (2013.01); *G06Q 10/06314* (2013.01)

(58) Field of Classification Search
CPC ......... Y10T 307/359–307/391; Y10T 307/658

(Continued)

(56) References Cited

U.S. PATENT DOCUMENTS 7,808,127 B2 * 10/2010 Teggatz ................ H02J 7/0055
                                                     307/72
8,138,624 B2 *  3/2012 Yeh .......................... B60L 1/00
                                                     307/10.1

(Continued)

FOREIGN PATENT DOCUMENTS

CN       104022536 A     9/2014
CN       105160451 A    12/2015
CN       106026152 B     6/2017

OTHER PUBLICATIONS

Real-Time Modeling of Distributed Plug-in Vehicles for V2G Transactions, Venaygamoorthy et al. IEEE, Sep. 2009.*

(Continued)

*Primary Examiner* — Fritz M Fleming
(74) *Attorney, Agent, or Firm* — Wayne & Ken, LLC; Tony Hom

(57) ABSTRACT

A charging and discharging scheduling method for electric vehicles in microgrid under time-of-use price includes: determining the system structure of the microgrid and the characters of each unit; establishing the optimal scheduling objective function of the microgrid considering the depreciation cost of the electric vehicle (EV) battery under time-of-use price; determining the constraints of each distributed generator and EV battery, and forming an optimal scheduling model of the microgrid together with the optimal scheduling objective function of the microgrid; determining the amount, starting and ending time, starting and ending charge state, and other basic calculating data of the EV accessing the microgrid under time-of-use price; determining the charge and discharge power of the EV when accessing the grid, by solving the optimal scheduling model of the microgrid with a particle swarm optimization algorithm.

4 Claims, 3 Drawing Sheets

(58) Field of Classification Search
USPC .......................................... 307/25–29, 72–76
See application file for complete search history.

(56) References Cited

U.S. PATENT DOCUMENTS

| | | | | |
|---|---|---|---|---|
| 2004/0066094 A1* | 4/2004 | Suzuki | ...................... | H02J 3/38 307/18 |
| 2010/0076615 A1* | 3/2010 | Daniel | ...................... | F03D 9/00 700/293 |
| 2011/0095606 A1* | 4/2011 | Ou | ......................... | H02J 3/383 307/26 |
| 2011/0125684 A1 | 5/2011 | Al-Duwaish et al. | | |
| 2011/0273022 A1* | 11/2011 | Dennis | ...................... | H02J 1/10 307/72 |
| 2012/0249065 A1* | 10/2012 | Bissonette | ............ | B60L 11/184 320/109 |
| 2012/0259477 A1* | 10/2012 | Abido | ...................... | H02J 3/38 700/297 |
| 2013/0057211 A1* | 3/2013 | Kuribayashi | ....... | B60L 11/1844 320/109 |
| 2013/0190938 A1* | 7/2013 | Zadeh | ................. | H02J 13/0013 700/291 |
| 2013/0313908 A1* | 11/2013 | Liu | .......................... | H02J 1/10 307/72 |
| 2015/0039145 A1* | 2/2015 | Yang | ........................ | H02J 3/00 700/291 |
| 2015/0333524 A1* | 11/2015 | Nishikawa | ................ | H02J 3/32 307/26 |
| 2016/0176305 A1* | 6/2016 | James | ................. | B60L 11/1816 307/26 |
| 2016/0204611 A1* | 7/2016 | Chambon | ............. | H02J 3/1835 307/26 |

OTHER PUBLICATIONS

PSO-based Method to Find Electric Vehicle's Optimal Charging Schedule under Dynamic Electricity Price, An et al. IEEE, Apr. 2013.*
"Study of Economic Operation in Microgrid," Mar. 2011.
"CROA," May 2014.
Office Action dated Feb. 27, 2017 in CN Application No. 201610347527.
Office Action dated Jan. 17, 2017 in CN Application No. 201610347527.
Office Action dated Apr. 19, 2017 in CN Application No. 201610347527.
Search Report dated May 19, 2016 in CN Application No. 201610347527.
Supplementary Search Report dated Jul. 12, 2016 in CN Application No. 201610347527.

* cited by examiner

CHARGING AND DISCHARGING SCHEDULING METHOD FOR ELECTRIC VEHICLES IN MICROGRID UNDER TIME-OF-USE PRICE

CROSS-REFERENCE TO RELATED APPLICATION

The present application claims priority to the Chinese patent application No. 201610347527.0 filed in the State Intellectual Property Office of the P.R.C on May 19, 2016, which is incorporated herein by reference in its entirety.

TECHNICAL FIELD

The present invention relates to the field of microgrid scheduling, and particularly to a charging and discharging scheduling method for electric vehicles in microgrid under time-of-use price.

BACKGROUND

Microgrid refers to a small power distribution system composed of distributed generators and energy storage system and so on. It is an autonomous system capable of self control, protection and management. Microgrid can run with the main grid jointly or run in isolation, and it is an important constituent part of the smart grid. The basic goal of optimal scheduling of microgrid is to reasonably and effectively arrange the output of each distributed generator, and the transaction power with the main grid by certain control strategies under the premise that the system load requirement of the microgrid is met, so as to minimize the operation and maintenance cost, and the emission cost of the whole microgrid.

With the increasing development of human society, energy and environment problems are becoming more prominent. In order to secure energy safety and transform toward a low-carbon economy, various countries take the development of electric vehicle (hereinafter referred to as EV) as an important strategy to deal with the energy source and environment problems. In China, the EV is listed as one of the strategic emerging industries and its industry application is vigorously promoted. The battery of EV as a mobile-decentralized energy storage device, can not only absorb power from the main grid, but also feed power back to the main grid. Therefore, EV can participate in the operation and control of an electric power system. For the main grid, the battery of EV could play a role of load shifting and improve the stability of the power grid; and for a user, a reasonable arrangement of charge and discharge of EV could reduce the cost for electricity. Besides, EV could also provide the user with a reliable reserved power source, so as to reduce the loss caused by power outages.

The existing optimal scheduling methods considering EV accessing microgrid often do not consider the cost of depreciation from the charge and discharge of EV battery, which is negative for economically managing the EV battery. In real life, the time of an EVs accessing the microgrid, the state of charge of EV batteries when accessed, and the minimal state of charge of batteries required by EVs when leaving the microgrid are different, such differences are not considered in the optimal scheduling model of the existing scheduling methods considering EVs accessing the microgrid, which is negative for the optimal load scheduling of the micro grid containing EVs in practice.

SUMMARY

The present invention provides a charging and discharging scheduling method for electric vehicles in microgrid under time-of-use price according to the shortcomings in the prior art, expecting to enable an optimal charge and discharge scheduling of the electric vehicles accessing the microgrid, so as to play an important role in load shifting, to improve the safety and stability of the microgrid operation under time-of-use price environment, and to increase the efficiency of energy utilization and the microgrid operation.

The present invention adopts technical solution as follows so as to solve the technical problems:

A charging and discharging scheduling method for electric vehicles in microgrid under time-of-use price of the present invention is characterized in comprising the steps as follows:

step 1, determining the system structure of the microgrid and the characters of each unit;

step 2, establishing the optimal scheduling objective function of the microgrid considering the depreciation cost of the EV battery under time-of-use price;

step 3, determining the constraint conditions of each distributed generator and EV battery; and forming an optimal scheduling model of the microgrid together with the optimal scheduling objective function of the microgrid;

step 4, determining the amount, the starting and ending time, the starting and ending state of charge, and other basic calculating data of the EVs accessing the microgrid under time-of-use price;

step 5, determining the charge and discharge power of the electric vehicle when accessing the microgrid, by solving the optimal scheduling model of the microgrid with the particle swarm optimization (PSO) algorithm.

The charging and discharging scheduling method for electric vehicles in microgrid under time-of-use price of the present invention is also characterized in that:

The system structure of the microgrid in the step 1 comprises: photovoltaic unit PV, wind turbine unit WT, diesel generator DG, micro turbine MT, electric vehicle EV;

The characters of each unit comprise:

The output power $P_{PV}$ of the PV, is obtained through equation (1):

$$P_{PV} = P_{STC} \frac{G_{ING}}{G_{STC}} [1 + k(T_c - T_r)] \quad (1)$$

In equation (1), $G_{ING}$ is the actual light intensity received by the PV, $G_{STC}$ is the light intensity received by the PV under the standard test condition, $P_{STC}$ is the maximum output power of the PV under the standard test condition, k is the coefficient of power generation temperature of the PV, $T_c$ is the actual battery temperature of the PV, is the rated battery temperature of the PV;

The output power $P_{WT}$ of the WT, is obtained through equation (2):

$$P_{WT} = \begin{cases} 0 & V < V_{ci} \\ a \times V^3 - b \times P_r & V_{ci} < V < V_r \\ P_r & V_r < V < V_{co} \\ 0 & V > V_{co} \end{cases} \quad (2)$$

In equation (2), a and b represent the coefficient of the output power $P_{WT}$ of the WT respectively; and $$a = \frac{P_r}{V_r^3 - V_{ci}^3}, b = \frac{V_{ci}^3}{V_r^3 - V_{ci}^3};$$

V represents an actual wind speed; $V_{ci}$, $V_r$ and $V_{co}$ refer to the cut-in wind speed, the rated wind speed and the cut-out wind speed of the WT respectively; $P_r$ is the rated output power of the WT; The fuel cost $C_{DG}$ of the DG, is obtained through equation (3):

$$C_{DG} = \Sigma(\alpha + \beta P_{DG}(t) + \gamma P_{DG}^2(t))\Delta t \qquad (3)$$

In equation (3), $\alpha$, $\beta$ and $\gamma$ are parameters of the DG; $P_{DG}(t)$ is the output power of the DG at time t; $\Delta t$ is the duration of each time interval;

The efficiency function $\eta_{MT}$ of the MT, is obtained through equation (4):

$$\eta_{MT} = x\left(\frac{P_{MT}}{P_R}\right)^3 + y\left(\frac{P_{MT}}{P_R}\right)^2 + z\left(\frac{P_{MT}}{P_R}\right) + c \qquad (4)$$

In equation (4), x, y, z and c are parameters of the MT; $P_R$ and $P_{MT}$ are the rated power and output power of the MT, respectively;

The cost function $C_{MT}$ of the MT, is obtained through equation (5):

$$C_{MT} = \frac{C_{GAS}}{LHV} \Sigma \frac{P_{MT}(t)\Delta t}{\eta_{MT}(t)} \qquad (5)$$

In equation (5), $C_{GAS}$ is the price of the natural gas supplied to the MT; LHV is the low heating value of the natural gas; $P_{MT}(t)$ is the output power of the MT at time t; $\eta_{MT}(t)$ is the power generation efficiency of the MT at time t.

The optimal scheduling objective function of the microgrid in the step 2 is:

$$minC = \sum_{i=1}^{N}\sum_{t=1}^{T}[F_i(P_i(t)) + OM_i(P_i(t))] + C_{GRID} + C_{BAT} \qquad (6)$$

In equation (6), C is the total operation cost of the microgrid; N is the total amount of the distributed generators within the microgrid; T is the total amount of the time intervals of a scheduling cycle of the microgrid; t is the number of the time intervals; $P_i(t)$ is the output power of distributed generator i within time interval t; $F_i(P_i(t))$ is the fuel cost of distributed generator i within time interval t; $OM_i(P_i(t))$ is the operation and maintenance cost of distributed generator i within time interval t, and is obtained through equation (7):

$$OM_i(P_i(t)) = K_{OM_i}P_i(t) \qquad (7)$$

In equation (7), $K_{OM_i}$ is an operation and maintenance cost coefficient of distributed generator i;

In equation (6), $C_{GRID}$ is the transaction cost of the microgrid with the main grid, and is obtained through equation (8):

$$C_{GRID} = \sum_{t=1}^{T}|P_{GRID}(t)|S_t \qquad (8)$$

In equation (8), $P_{GRID}(t)$ is the interactive energy of the microgrid with the main grid within time interval t; $S_t$ represents the electricity price of the main grid within time interval t;

In equation (6), $C_{BAT}$ is the battery depreciation cost of the EV, and is obtained through equation (9):

$$C_{BAT} = \sum_{j=1}^{n}\left(\frac{C_{REP}}{E_{PUT}}\int_{t_{j1}}^{t_{j2}}|P_j^{EV}(t)|dt\right) \qquad (9)$$

In equation (9), n is the amount of the EVs EV accessing the microgrid, $C_{REP}$ is the battery replacement cost of the EV, $E_{PUT}$ is the total energy throughput of the EV during the lifetime of the battery thereof, $t_{j1}$ and $t_{j2}$ are the starting and ending time of EV j accessing the microgrid, $P_j^{EV}(t)$ is the charge or discharge power of the battery of EV j within time interval t after accessing the microgrid.

The constraint conditions of the distributed generators and the EV batteries in the step 3 are:

$$\sum_{i=1}^{N}P_i + P_{GRID} + P_{EV} = P_{LOAD} \qquad (10)$$

$$P_i^{min} \leq P_i \leq P_i^{max} \qquad (11)$$

$$|P_i(t) - P_i(t-1)| \leq r_i \qquad (12)$$

$$SOC_j^{min} \leq SOC_j \leq SOC_j^{max} \qquad (13)$$

$$P_j^{min} \leq P_j \leq P_j^{max} \qquad (14)$$

$$SOC_{t_{j2}} \geq SOC_{t_{j2}}^{min} \qquad (15)$$

$$P_L^{min} \leq P_{GRID}(t) \leq P_L^{max} \qquad (16)$$

Equation (10) represents power equilibrium constraint; $P_i$ is the actual output power of distributed generator i; $P_{GRID}$ is the actual interactive energy of the microgrid with the main grid; $P_{EV}$ is the net output power of all the EVs in the microgrid; $P_{LOAD}$ is the total load demand of the microgrid users;

Equation (11) represents the constraint of the own power generation capacity of the distributed generator i, wherein $P_i^{max}$ and $P_i^{min}$ are the upper and lower limit of the output power of the distributed generator i respectively;

Equation (12) represents the ramping-rate constraint of the distributed generator i, wherein $P_i(t-1)$ is the output power of the distributed generator i within time interval t-1; $r_i$ is the maximum ramping rate of distributed generator i;

Equation (13) represents the state of charge constraint of EV j; $SOC_j$ represents the state of charge of the battery of the EV j; $SOC_j^{max}$ and $SOC_j^{min}$ represent the upper and lower limit of the state of charge of the battery of the EV j respectively;

Equation (14) represents the charge and discharge power constraint of the EV; $P_j^{max}$ represents the upper limit of the discharge power of EV j; $P_j^{min}$ represents the lower limit of the charge power of EV j;

Equation (15) represents the state of charge constraint of EV j at the ending time of accessing the microgrid; $SOC_{t_{j2}}$ is the state of charge of the EV j when leaving the microgrid at time $t_{j2}$, $SOC_{t_{j2}}^{min}$ is the minimum state of charge which meets the driving demands when EV j leaves the microgrid;

Equation (16) is the transmission capacity constraint of the connection lines between the microgrid and the main grid; $P_L^{min}$ is the lower limit of the transaction power from the microgrid to the grid, $P_L^{max}$ is the upper limit of the transaction power from the grid to the microgrid.

The step 4 comprises:

Step 4.1, dividing 24 hours of one day into three time periods: peak time period, flat time period and valley time period according to the peak-valley time-of-use price applied by the main grid;

Step 4.2, determining the total load demand $P_{LOAD}$ and the output power of the PV and the WT respectively;

Step 4.3, determining the total energy throughput $E_{PUT}$ of the EV during the lifetime of the battery thereof, the battery replacement cost $C_{REP}$ of the EV, the amount n of the EVs accessing the microgrid, the starting and ending time $t_{j1}$ and $t_{j2}$ of EV j accessing the microgrid, the state of charge $SOC_{t_{j1}}$ when accessing and the minimum state of charge $SOC_{t_{j2}}^{min}$ required when leaving the microgrid, respectively;

Step 4.4, determining the parameters $\alpha$, $\beta$ and $\gamma$ of the DG, the parameters x, y, z, c and the rated power $P_R$ of the MT, the price of natural gas $C_{GAS}$, the low heating value of the natural gas LHV and the operation and maintenance cost coefficient $K_{OM_i}$ of distributed generator i which has accessed the microgrid.

The step 5 comprises:

Step 5.1, taking the output powers of the DG and the MT, the interactive power of the main grid and the microgrid, and the exchanged power of each EV with the microgrid in every moment, as one dimension of particle k, such that the number of the dimension T(n+3) of particle k is obtained;

Step 5.2, initializing each parameter of the PSO, the parameters including: the total number M of the particles, the number of iterations L, the maximum number of iterations $L_{max}$, the speed updating parameters $c_1$ and $c_2$, $1 \leq L \leq L_{max}$, and initializing L=1;

Step 5.3, determining the actual value of each constraint condition in step 3 and the basic parameters in step 4, and substituting them into the constraint conditions and objective functions of the PSO, respectively;

Step 5.4, producing the initial population, obtaining the position and speed of particle k of generation L, and modifying the position and speed of the particles according to the constraint conditions in the step 3;

Step 5.5, calculating the fitness value of particle k in accordance with objective function minC, and selecting the maximum fitness value among M particles of generation L as the group extreme value of generation L;

Step 5.6, calculating the position and speed of particle k of generation L+1 according to the position and speed of particle k of generation L respectively, and modifying the position and speed of the particles according to the constraint conditions in step 3, so as to obtain the positions and speeds of M particles in the particle group of generation L+1;

Step 5.7, recalculating the fitness value of particle k of generation L+1, and comparing it with the fitness value of particle k of generation L, selecting the larger fitness value as the individual extreme value of particle k of generation L+1; and selecting the maximum fitness value among the individual extreme values of M particles of generation L+1, as the group extreme value of generation L+1;

Step 5.8, assigning L+1 to L, and judging whether $L < L_{max}$, if yes, proceeding to step 5.6; otherwise stopping the iterations, and obtaining the group extreme value of generation $L_{max}$;

Step 5.9, taking the scheduling solution corresponding to the group extreme value of generation $L_{max}$, as the optimal scheduling solution, such that the charge and discharge powers of EV accessing the microgrid at different times under the constraint conditions are obtained.

Compared with the prior art, the advantages of the present invention are:

1. The charging and discharging scheduling method for electric vehicles in microgrid under time-of-use price applied in the present invention, accesses the EV battery to the microgrid as a mobile-decentralized energy storage device, plays a role of load shifting, improves the safety and stability of the microgrid operation under time-of-use price, and meanwhile increases the efficiency of energy utilization and the economy of the microgrid operation.

2. The charging and discharging scheduling method for electric vehicles in microgrid under time-of-use price applied in the present invention, incorporates not only the EVs, but also the photovoltaic unit, the wind turbine unit, the diesel generator, the micro turbine of distributed power sources into the optimal scheduling model of the microgrid, which consummates the optimal scheduling model considering only the EVs accessing the microgrid in the prior art.

3. The charging and discharging scheduling method for electric vehicles in microgrid under time-of-use price applied in the present invention, considers the depreciation cost of the EV battery on the basis of considering the fuel cost of the distributed generators, the operation and maintenance cost, the transaction cost of the microgrid with the main grid, which realizes the economic management for the EV battery, makes the scheduling objectives of the optimal scheduling model more reasonable.

4. The charging and discharging scheduling method for electric vehicles in microgrid under time-of-use price applied in the present invention, considers the amount of the EVs accessing the microgrid, the starting and ending time when each EV accesses, the state of charge of the battery when the EV accesses and the minimum state of charge required by the battery when leaving the grid, which better conforms to the state of the EV accessing the grid in real life, and therefore the microgrid economic scheduling model built accordingly is more comprehensive.

5. The charging and discharging scheduling method for electric vehicles in microgrid under time-of-use price applied in the present invention, applies the particle swarm optimization (PSO) algorithm to be solved, takes the generation powers of the diesel generator and the micro turbine, the transaction power of the main grid and the microgrid, and the exchanged power of each EV with the microgrid in every moment, as one dimension of a particle. The PSO is simple and commonly used, possesses great robustness and precision, has fast convergence, and good optimization ability to complex nonlinear problems.

DETAILED DESCRIPTION

Figure 1:
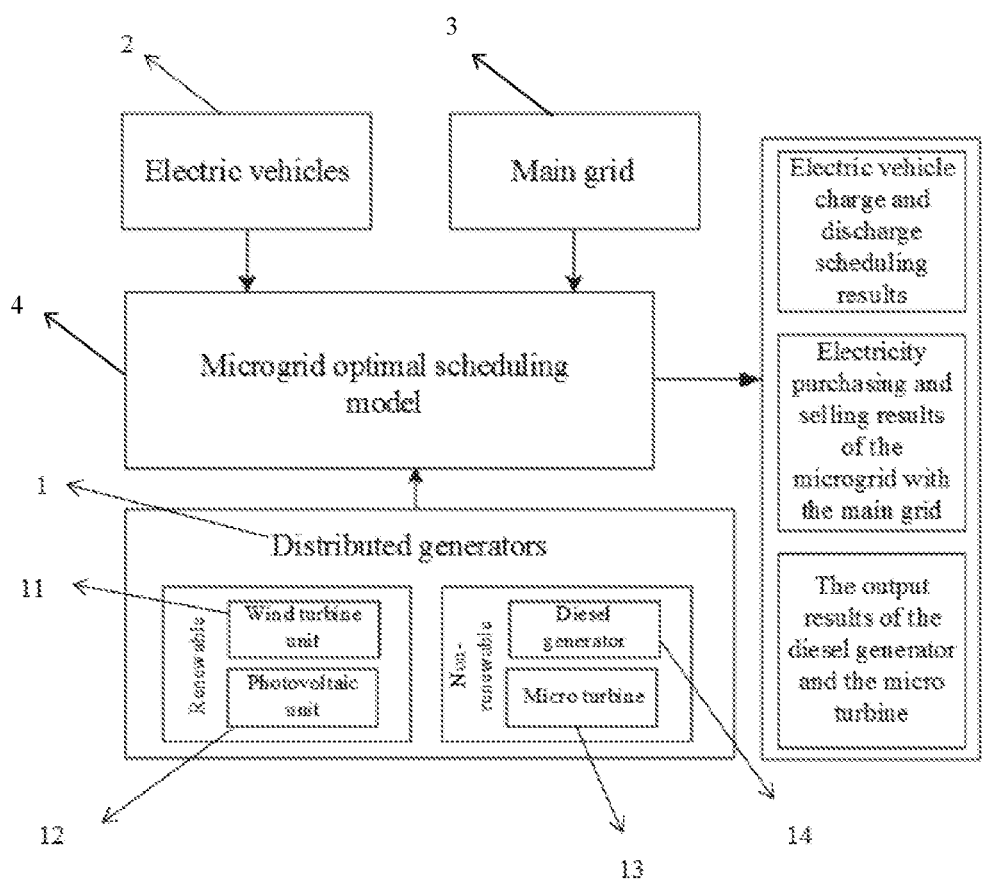
FIG. 1 illustrates the whole structure of the present invention.
Figure 2:
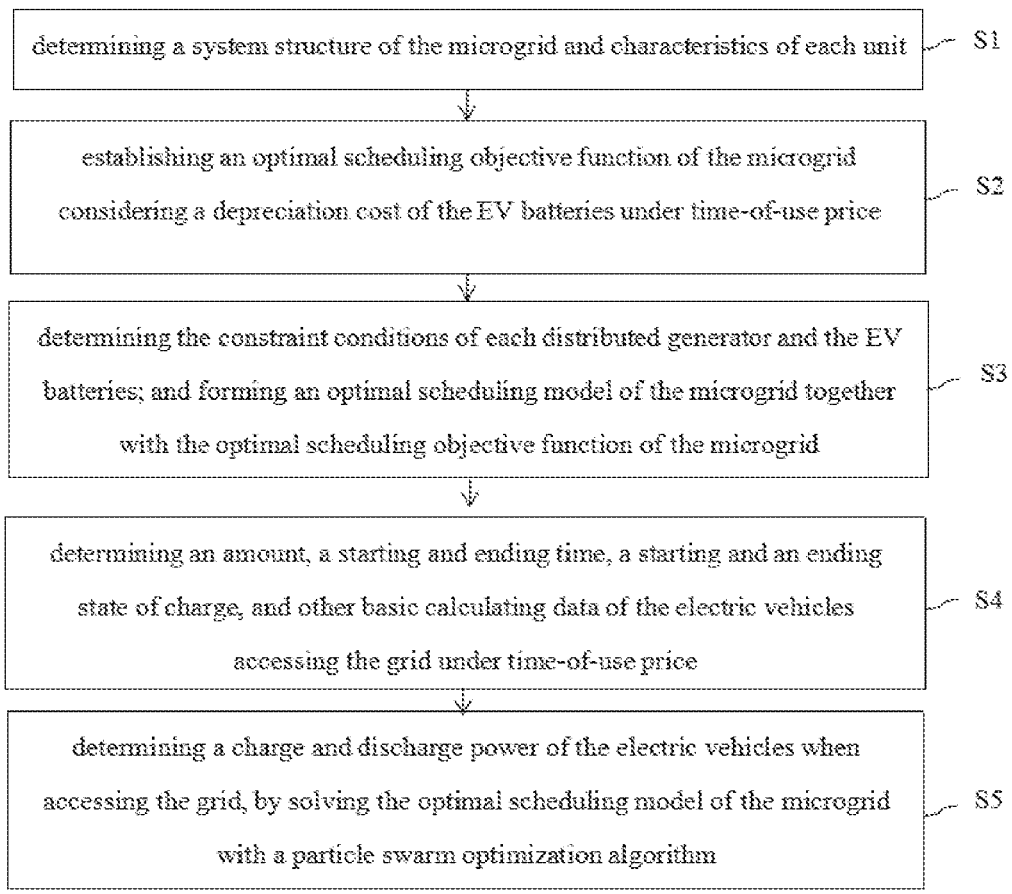
FIG. 2 is a flowchart illustrating a charging and discharging scheduling method for electric vehicles in microgrid under time-of-use price.

In this embodiment, a charging and discharging scheduling method for electric vehicles in microgrid under time-of-use price comprises:

Step 1 as shown in FIG. 2 as S1, determining the system structure of the microgrid and the characteristics of each unit;

As shown in FIG. 1, the system structure of the microgrid comprises: a photovoltaic unit PV 12, a wind turbine unit WT 11, a diesel generator DG 14, a micro turbine MT 13, electric vehicles EVs 2;

The characters of each unit comprise:

The output power $P_{PV}$ of the PV, is obtained through equation (1):

$$P_{PV} = P_{STC} \frac{G_{ING}}{G_{STC}} [1 + k(T_c - T_r)] \quad (1)$$

In equation (1), $G_{ING}$ is the actual light intensity received by the PV, $G_{STC}$ is the light intensity received by the PV under the standard test condition, $P_{STC}$ is the maximum output power of PV under the standard test condition, k is the coefficient of power generation temperature of the PV, $T_c$ is the actual battery temperature of the PV, is the rated battery temperature of the PV;

The output power $P_{WT}$ of the WT, is obtained through equation (2):

$$P_{WT} = \begin{cases} 0 & V < V_{ci} \\ a \times V^3 - b \times P_r & V_{ci} < V < V_r \\ P_r & V_r < V < V_{co} \\ 0 & V > V_{co} \end{cases} \quad (2)$$

In equation (2), a and b are the coefficient of the output power $P_{WT}$ of the WT; and $$a = \frac{P_r}{V_r^3 - V_{ci}^3}, b = \frac{V_{ci}^3}{V_r^3 - V_{ci}^3};$$

$V_{ci}$, $V_r$ and $V_{co}$ represent the cut-in wind speed, the rated wind speed and the cut-out wind speed of the WT, respectively; $P_r$ is the rated output power of the WT;

Wherein, the PV and the WT both apply the control method of maximum power tracking output, which enables to make full use of solar energy and wind energy;

The fuel cost $C_{DG}$ of the DG, is obtained through equation (3):

$$C_{DG} = \Sigma(\alpha + \beta P_{DG}(t) + \gamma P_{DG}^2(t))\Delta t \quad (3)$$

In equation (3), α, β and γ are parameters of the DG, and are determined by the type of the DG, for example, the fuel cost function of a certain DG is $C_{DG} = \Sigma(150 + 0.12 P_{DG}(t) + 0.00085 P_{DG}^2(t))\Delta t$; $P_{DG}(t)$ is the output power of the DG at time t; Δt is the duration of each time interval;

The efficiency function $\eta_{MT}$ of the MT, is obtained through equation (4):

$$\eta_{MT} = x\left(\frac{P_{MT}}{P_R}\right)^3 + y\left(\frac{P_{MT}}{P_R}\right)^2 + z\left(\frac{P_{MT}}{P_R}\right) + c \quad (4)$$

In equation (4), x, y, z and c are parameters of the MT, and are obtained by fitting the efficiency curves provided from the manufacturers, different parameters are obtained by fitting different types of turbine, for example, the efficiency function of a certain MT is $$\eta_{MT} = 0.0753\left(\frac{P_{MT}}{65}\right)^3 - 0.3095\left(\frac{P_{MT}}{65}\right)^2 + 0.4174\left(\frac{P_{MT}}{65}\right) + 0.1068;$$

$P_R$ and $P_{MT}$ are the rated power and output power of the MT, respectively;

The cost function $C_{MT}$ of the MT, is obtained through equation (5):

$$C_{MT} = \frac{C_{GAS}}{LHV} \Sigma \frac{P_{MT}(t)\Delta t}{\eta_{MT}(t)} \quad (5)$$

In equation (5), $C_{GAS}$ is the price of the natural gas supplied to the MT, the gas cost per unit could be $C_{GAS}=0.4$; LHV is the low heating value of the natural gas, which normally is 9.73 kwh/m³; the low heating value refers to the heat released when the vapor generated by burning the fuel containing hydrogen keeps a gaseous state; $P_{MT}(t)$ is the output power of the MT at time t; $\eta_{MT}(t)$ is the power generation efficiency of the MT at time t.

Step 2 as shown in FIG. 2 as S2, establishing an optimal scheduling objective function of the microgrid considering the depreciation cost of the EV battery under time-of-use price;

The optimal scheduling objective function of the microgrid is:

$$minC = \sum_{i=1}^{N} \sum_{t=1}^{T} [F_i(P_i(t)) + OM_i(P_i(t))] + C_{GRID} + C_{BAT} \quad (6)$$

In equation (6), C is the total operation cost of the microgrid; N is the total amount of the distributed generators within the microgrid; T is the total amount of the time intervals of a scheduling cycle of the microgrid; t is the number of the time intervals; $P_i(t)$ is the output power of distributed generator i within time interval t; $F_i(P_i(t))$ is the fuel cost of distributed generator i within time interval t; $OM_i(P_i(t))$ is the operation and maintenance cost of distributed generator i within time interval t, and is obtained through equation (7):

$$OM_i(P_i(t)) = K_{OM_i} P_i(t) \quad (7)$$

In equation (7), $K_{OM_i}$ is an operation and maintenance cost coefficient of distributed generator i, and the table below is the operation and maintenance cost coefficients of a certain set of distributed generators:

| TYPE | PV | WT | DG | MT |
|---|---|---|---|---|
| Operation and Maintenance Cost Coefficient $K_{OM}$/Yuan · (kWh)⁻¹ | 0.0096 | 0.0296 | 0.088 | 0.0293 |

In equation (6), $C_{GRID}$ is the transaction cost of the microgrid with the main grid 3, and is obtained through equation (8):

$$C_{GRID} = \sum_{t=1}^{T} |P_{GRID}(t)|S_t \qquad (8)$$

In equation (8), $P_{GRID}(t)$ is the interactive energy of the microgrid with the main grid 3 within time interval t; $S_t$ represents the electricity price of the main grid 3 within time interval t, the positive value thereof represents the purchasing price of electricity, and the negative value represents the selling price of electricity;

In equation (6), $C_{BAT}$ is the battery depreciation cost of an EV, wherein under normal circumstances, as the discharge depth increases, the number of times of recyclable charge and discharge of an EV battery reduces, which brings difficulty in calculating cycle times, but since the total recyclable charge and discharge amount of the battery basically keeps constant, the charge and discharge depreciation cost of the EV battery is obtained through equation (9):

$$C_{BAT} = \sum_{j=1}^{n} \left( \frac{C_{REP}}{E_{PUT}} \int_{t_{j1}}^{t_{j2}} |P_j^{EV}(t)| dt \right) \qquad (9)$$

In equation (9), n is the amount of the EVs accessing the microgrid, $C_{REP}$ is the battery replacement cost of the EV, $E_{PUT}$ is the total energy throughput of the EV during the lifetime of the battery thereof, $$E_{PUT} = \frac{\sum_{l=1}^{m} E_r h_{DOD_l} M_l \square 2}{m},$$

wherein, $E_r$ is the rated capacity of the EV battery, m is the amount of the EV batteries tested at different discharge depth, $h_{DOD_l}$ is the discharge depth of the EV battery in test l, $M_l$ is the total cycle times of the EV battery in test 1, wherein the cycle times of different discharge depths and the corresponding total energy throughput are provided by the manufacturer; $t_{j1}$ and $t_{j2}$ are the starting and ending time of EV j accessing the microgrid, $P_j^{EV}(t)$ is the charge and discharge power of the battery of EV j within time interval t after accessing the microgrid, wherein a positive value represents discharge, and a negative value represents charge.

Step 3 as shown in FIG. 2 as S3, determining the constraint conditions of each distributed generator and EV battery; and forming an optimal scheduling model of the microgrid 4 together with the optimal scheduling objective function of the microgrid;

The constraint conditions of the distributed generators and the EV batteries are:

$$\sum_{i=1}^{N} P_i + P_{GRID} + P_{EV} = P_{LOAD} \qquad (10)$$

$$P_i^{min} \leq P_i \leq P_i^{max} \qquad (11)$$

$$|P_i(t) - P_i(t-1)| \leq r_i \qquad (12)$$

$$SOC_j^{min} \leq SOC_j \leq SOC_j^{max} \qquad (13)$$

$$P_j^{min} \leq P_j \leq P_j^{max} \qquad (14)$$

$$SOC_{t_{j2}} \geq SOC_{t_{j2}}^{min} \qquad (15)$$

$$P_L^{min} \leq P_{GRID}(t) \leq P_L^{max} \qquad (16)$$

Equation (10) represents power equilibrium constraint; $P_i$ is the actual output power of distributed generator i; $P_{GRID}$ is the actual interactive energy of the microgrid with the main grid 3; $P_{EV}$ is the net output power of all the EVs in the microgrid; $P_{LOAD}$ is the total load demand of the microgrid users;

Equation (11) represents the constraint of the own power generation capacity of distributed generator i, wherein $P_i^{max}$ and $P_i^{min}$ are the upper and lower limit of the output power of the distributed generator i, respectively;

Equation (12) represents the ramping-rate constraint of distributed generator i, wherein $P_i(t-1)$ is the output power of the distributed generator i within time interval t−1; $r_i$ is the maximum ramping rate of the distributed generator i;

Equation (13) represents the state of charge constraint of EV j; $SOC_j$ represents the state of charge of the battery of the EV j; $SOC_j^{max}$ and $SOC_j^{min}$ represent the upper and lower limit of the state of charge of the battery of the EV j, respectively;

Equation (14) represents the charge and discharge power constraint of the EV; $P_j^{max}$ represents the upper limit of the discharge power of EV j; $P_j^{min}$ represents the lower limit of the charge power of EV j, which is normally determined by the type of the EV battery;

Equation (15) represents the state of charge constraint of EV j at the ending time of accessing the microgrid; $SOC_{t_{j2}}$ is the state of charge of the EV j when leaving the microgrid at time $t_{j2}$, $SOC_{t_{j2}}^{min}$ is the minimum state of charge which meets the driving demands when the EV j leaves the microgrid, which is set independently according to the demands by the owner of the EV;

Equation (16) is the transaction capacity constraint of the connection lines between the microgrid and the main grid 3; $P_L^{min}$ is the lower limit of the transaction power from the microgrid to the grid, $P_L^{max}$ is the upper limit of the transaction power from the grid to the microgrid.

Step 4 as shown in FIG. 2 as S4, determining the amount, the starting and ending time, the starting and ending state of charge, and other basic calculating data of the EV accessing the microgrid under time-of-use price;

Step 4.1, dividing 24 hours of one day into three time periods: peak time period, flat time period and valley time period according to the peak-valley time-of-use price applied by the main grid 3;

Step 4.2, determining the total load demand $P_{LOAD}$ and output power of the PV and the WT, respectively;

Step 4.3, determining the total energy throughput $E_{PUT}$ of the EV during the lifetime of the battery thereof, the battery replacement cost $C_{REP}$ of the EV, the amount n of the EVs accessing the microgrid, the starting and ending time $t_{j1}$ and $t_{j2}$ of EV j accessing the microgrid, the state of charge $SOC_{t_{j1}}$ when accessing and the minimum state of charge $SOC_{t_{j2}}^{min}$ required when leaving the microgrid, respectively;

Step 4.4, determining the parameters α, β and γ of the DG, the parameters x, y, z, c and the rated power $P_R$ of the MT, the price of natural gas $C_{GAS}$ the low heating value of the natural gas LHV and the operation and maintenance cost coefficient $K_{OM_i}$ of distributed generator i which has accessed the microgrid.

Step 5, as shown in FIG. 2 as S5, determining the charge and discharge power of the EV when accessing the microgrid, by solving the optimal scheduling model of the microgrid 4 with the PSO algorithm.

Figure 3:
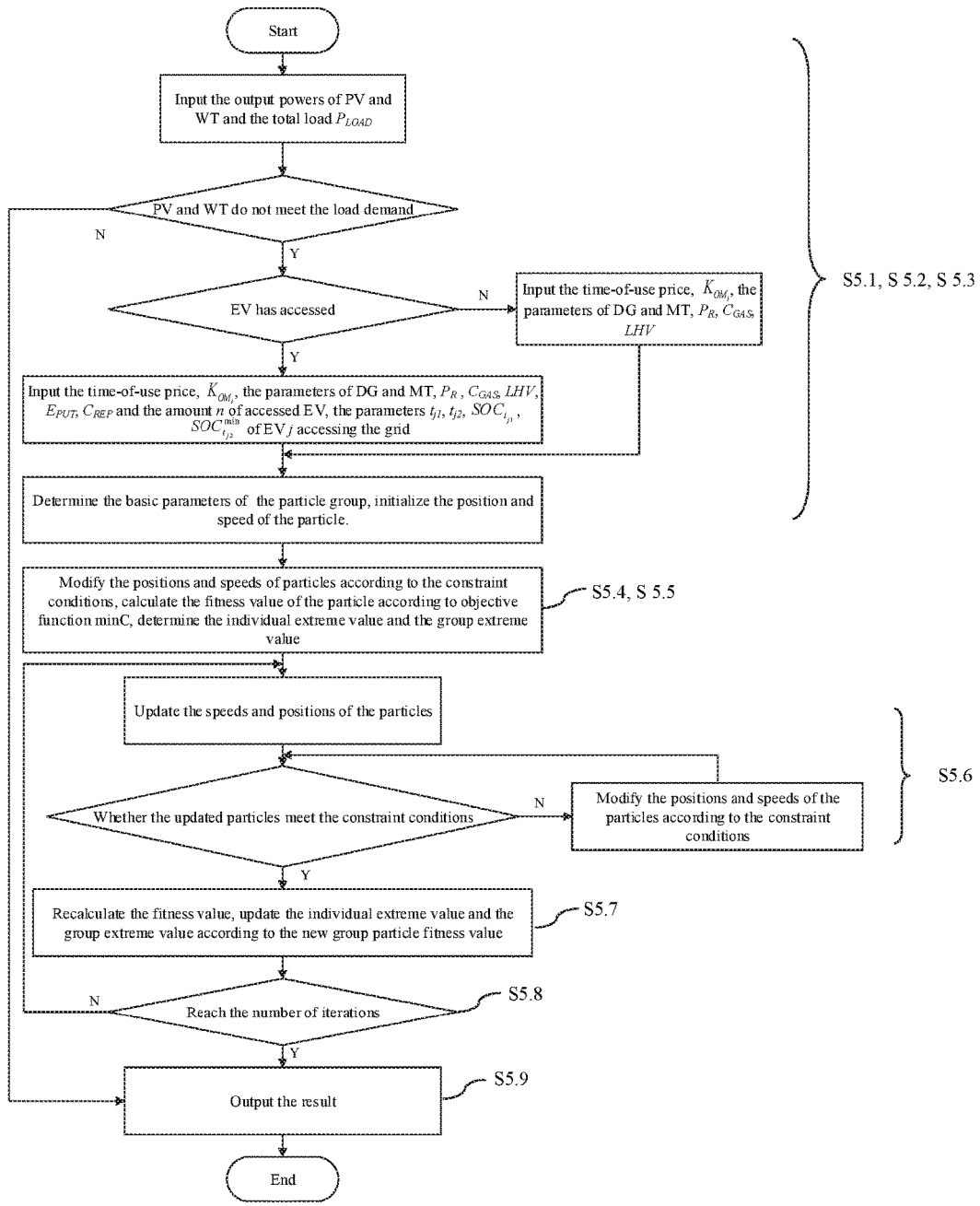
FIG. 3 is a flowchart illustrating the particle swarm optimization algorithm of the present invention.

Step 5.1 as shown in FIG. 3 as S5.1, taking the output powers of the DG and the MT, the interactive power of the main grid 3 and the microgrid, and the exchanged power of each EV with the microgrid in every moment, as one dimension of particle k, such that the number of the dimension T(n+3) of particle k is obtained;

Step 5.2 as shown in FIG. 3 as S5.2, initializing each parameter of the PSO, the parameters including: the total number M of the particles, the number of iterations L, the maximum number of iterations $L_{max}$, the speed updating parameters $c_1$ and $c_2$, $1 \leq L \leq L_{max}$, and initializing L=1;

Step 5.3 as shown in FIG. 3 as S5.3, determining the actual value of each constraint condition in Step 3 and the basic parameters in Step 4, and substituting them into the constraint conditions and objective functions of the PSO, respectively;

Step 5.4 as shown in FIG. 3 as S5.4, producing the initial population, obtaining the position and speed of particle k of generation L, and modifying the position and speed of the particles according to the constraint conditions in Step 3;

Step 5.5 as shown in FIG. 3 as S5.5, calculating the fitness value of particle k in accordance with objective function minC, and selecting the maximum fitness value among M particles of generation L as the group extreme value of generation L;

Step 5.6 as shown in FIG. 3 as S5.6, calculating respectively the position and speed of particle k of generation L+1 according to the position and speed of particle k of generation L, and modifying the position and speed of the particles according to the constraint conditions in Step 3, so as to obtain the positions and speeds of M particles in the particle group of generation L+1;

Step 5.7 as shown in FIG. 3 as S5.7, recalculating the fitness value of particle k of generation L+1, and comparing it with the fitness value of particle k of generation L, selecting the larger fitness value as the individual extreme value of particle k of generation L+1; and selecting the maximum fitness value among the individual extreme values of M particles of generation L+1, as the group extreme value of generation L+1;

Step 5.8 as shown in FIG. 3 as S5.8, assigning L+1 to L, and judging whether $L<L_{max}$, if yes, proceeding to Step 5.6; otherwise stopping the iterations, and obtaining the group extreme value of generation $L_{max}$;

Step 5.9 as shown in FIG. 3 as S5.9, taking the scheduling solution corresponding to the group extreme value of generation $L_{max}$, as the optimal scheduling solution, such that the charge and discharge powers of EV accessing the microgrid at different times under the constraint conditions are obtained.

What is claimed is:

1. A charging and discharging scheduling method for electric vehicles accessing a microgrid under time-of-use price, characterized in that, the method comprises:
   step 1, determining a system structure of the microgrid and characteristics of each unit;
   step 2, establishing an optimal scheduling objective function of the microgrid considering a depreciation cost of electric vehicle batteries under time-of-use price;
   step 3, determining constraint conditions of the system structure and each unit thereof; and forming an optimal scheduling model of the microgrid together with the optimal scheduling objective function of the microgrid;
   step 4, determining an amount, a starting and ending time, a starting and an ending state of charge, and other basic calculating data of the electric vehicles accessing the microgrid under time-of-use price;
   step 5, determining a charge and discharge power of the electric vehicles when accessing the microgrid, by solving the optimal scheduling model of the microgrid with a particle swarm optimization algorithm, wherein
the system structure of the microgrid in the step 1 comprises: photovoltaic unit PV, wind turbine unit WT, diesel generator DG, micro turbine MT, electric vehicle EV;
the characteristics of each unit comprise:
an output power $P_{PV}$ of the PV, is obtained through equation (1):

$$P_{PV} = P_{STC} \frac{G_{ING}}{G_{STC}} [1 + k(T_c - T_r)] \quad (1)$$

in equation (1), $G_{ING}$ is an actual light intensity received by the PV, $G_{STC}$ is a light intensity received by the PV under a standard test condition, $P_{STC}$ is a maximum output power of the PV under the standard test condition, k is a coefficient of power generation temperature of the PV, $T_c$ is an actual battery temperature of the PV, $T_r$ is a rated battery temperature of the PV;

an output power $P_{WT}$ of the WT, is obtained through equation (2):

$$P_{WT} = \begin{cases} 0 & V < V_{ci} \\ a \times V^3 - b \times P_r & V_{ci} < V < V_r \\ P_r & V_r < V < V_{co} \\ 0 & V > V_{co} \end{cases} \quad (2)$$

in equation (2), a and b represent a coefficient or me output power $P_{WT}$ of the WT, respectively; and $$a = \frac{P_r}{V_r^3 - V_{ci}^3}, \quad b = \frac{V_{ci}^3}{V_r^3 - V_{ci}^3};$$

V represents an actual wind speed; $V_{ci}$, $V_r$ and $V_{co}$ represent a cut-in wind speed, a rated wind speed and a cut-out wind speed of the WT, respectively; $P_r$ is a rated output power of the WT;

a fuel cost $C_{DG}$ of the DG, is obtained through equation (3):

$$C_{DG} = \Sigma(\alpha + \beta P_{DG}(t) + \gamma P_{DG}^2(t))\Delta t \quad (3)$$

in equation (3), $\alpha$, $\beta$ and $\gamma$ are parameters of the DG; $P_{DG}(t)$ is an output power of the DG at time t; $\Delta t$ is a duration of each time interval;

an efficiency function $\eta_{MT}$ of the MT, is obtained through equation (4):

$$\eta_{MT} = x\left(\frac{P_{MT}}{P_R}\right)^3 + y\left(\frac{P_{MT}}{P_R}\right)^2 + z\left(\frac{P_{MT}}{P_R}\right) + c \quad (4)$$

in equation (4), x, y, z and c are parameters of the MT; $P_R$ and $P_{MT}$ are a rated power and output power of the MT, respectively;

a cost function $C_{MT}$ of the MT, is obtained through equation (5):

$$minC = \sum_{i=1}^{N} \sum_{t=1}^{T} [F_i(P_i(t)) + OM_i(P_i(t))] + C_{GRID} + C_{BAT} \quad (6)$$

in equation (5), $C_{GAS}$ is a price of the natural gas supplied to the MT; LHV is a low heating value of the natural gas; $P_{MT}(t)$ is an output power of the MT at time t; $\eta_{MT}(t)$ is a power generation efficiency of the MT at time t; and wherein the optimal scheduling objective function of the microgrid in the step 2 is:

$$minC = \sum_{i=1}^{N} \sum_{t=1}^{T} [F_i(P_i(t)) + OM_i(P_i(t))] + C_{GRID} + C_{BAT} \quad (6)$$

in equation (6), C is a total operation cost of the microgrid; N is a total amount of the distributed generators within the microgrid; T is a total amount of the time intervals of a scheduling cycle of the microgrid; t is a number of the time intervals; $P_i(t)$ is an output power of distributed generator i within time interval t; $F_i(P_i(t))$ is a fuel cost of distributed generator i within time interval t; $OM_i(P_i(t))$ is an operation and maintenance cost of distributed generator i within time interval t, and is obtained through equation (7):

$$OM_i(P_i(t)) = K_{OM_i} P_i(t) \quad (7)$$

in equation (7), $K_{OM_i}$ is an operation and maintenance cost coefficient of distributed generator i;

in equation (6), $C_{GRID}$ is a transaction cost of the microgrid with a main grid, and is obtained through equation (8):

$$C_{GRID} = \sum_{t=1}^{T} |P_{GRID}(t)| S_t \quad (8)$$

in equation (8), $P_{GRID}(t)$ is an interactive energy of the microgrid with the main grid within time interval t; $S_t$ represents an electricity price of the main grid within time interval t;

in equation (6), $C_{BAT}$ is a battery depreciation cost of the electric vehicle EV, and is obtained through equation (9):

$$C_{BAT} = \sum_{j=1}^{n} \left( \frac{C_{REP}}{E_{PUT}} \int_{t_{j1}}^{t_{j2}} |P_j^{EV}(t)| dt \right) \quad (9)$$

in equation (9), n is an amount of the EVs accessing the microgrid, $C_{REP}$ is a battery replacement cost of the EV, $E_{PUT}$ is a total energy throughput of the EV during a lifetime of a battery thereof, $t_{j1}$ and $t_{j2}$ are starting and ending time of EV j accessing the microgrid, $P_j^{EV}(t)$ is charge or discharge power of the battery of EV j within time interval t after accessing the microgrid.

2. The charging and discharging scheduling method for electric vehicles accessing a microgrid under time-of-use price according to claim 1, characterized in that, the constraint conditions of the distributed generator and the EV batteries in the step 3 are:

$$\sum_{i=1}^{N} P_i + P_{GRID} + P_{EV} = P_{LOAD} \quad (10)$$

$$P_i^{min} \leq P_i \leq P_i^{max} \quad (11)$$

$$|P_i(t) - P_i(t-1)| \leq r_i \quad (12)$$

$$SOC_j^{min} \leq SOC_j \leq SOC_j^{max} \quad (13)$$

$$P_j^{min} \leq P_j \leq P_j^{max} \quad (14)$$

$$SOC_{t_{j2}} \geq SOC_{t_{j2}}^{min} \quad (15)$$

$$P_L^{min} \leq P_{GRID}(t) \leq P_L^{max} \quad (16)$$

equation (10) represents power equilibrium constraint; $P_i$ is an actual output power of distributed generator i; $P_{GRID}$ is the actual interactive energy of the microgrid with the main grid; $P_{EV}$ is a net output power of all the EVs in the microgrid; $P_{LOAD}$ is a total load demand of microgrid users;

equation (11) represents constraint of own power generation capacity of the distributed generator i, wherein $P_i^{max}$ and $P_i^{min}$ are upper and lower limit of output power of the distributed generator i, respectively;

equation (12) represents ramping-rate constraint of the distributed generator i, wherein $P_i(t-1)$ is output power of the distributed generator i within time interval t−1; $r_i$ is a maximum ramping rate of the distributed generator i;

equation (13) represents constraint of charge state of EV j; $SOC_j$ represents a state of charge of the battery of the EV j; $SOC_j^{max}$ and $SOC_j^{min}$ represent the upper and lower limit of the state of charge of the battery of the EV j, respectively;

equation (14) represents a charge and discharge power constraint of the EV; $P_j^{max}$ represents an upper limit of the discharge power of the EV j; $P_j^{min}$ represents a lower limit of the charge power of the EV j;

equation (15) represents constraint of charge state of the EV j at the ending time of accessing the microgrid; $SOC_{t_{j2}}$ is a state of charge of the EV j when leaving the microgrid at time $t_{j2}$, $SOC_{t_{j2}}^{min}$ is a minimum state of charge meeting the driving demands when the EV j leaves the microgrid;

equation (16) is a transmission capacity constraint of connection lines between the microgrid and the main grid; $P_L^{min}$ is a lower limit of the transaction power from the microgrid to the grid, $P_L^{max}$ is an upper limit of the transaction power from the grid to the microgrid.

3. The charging and discharging scheduling method for electric vehicles accessing a microgrid under time-of-use according to claim 1, characterized in that, the step 4 comprises:

step 4.1, dividing 24 hours of one day into three time periods: a peak time period, a flat time period and a valley time period according to a peak-valley time-of-use price applied by the main grid;

step 4.2, determining the total load demand $P_{LOAD}$ and output power of the PV and the WT, respectively;

step 4.3, determining the total energy throughput $E_{PUT}$ of the EV during a lifetime of the battery thereof, a battery replacement cost $C_{REP}$ of the EV, the amount n of the EVs accessing the microgrid, the starting and ending time $t_{j1}$ and $t_{j2}$ of EV j accessing the microgrid, the state of charge $SOC_{t_{j1}}$ when accessing and the minimum state of charge $SOC_{t_{j2}}^{min}$ required when leaving the microgrid, respectively;

step 4.4, determining the parameters $\alpha$, $\beta$ and $\gamma$ of the DG, the parameters x, y, z, c and the rated power $P_R$ of the MT, a price of natural gas $C_{GAS}$, the low heating value of the natural gas LHV and the operation and maintenance cost coefficient $K_{OM_i}$ of distributed generator i which has accessed the microgrid.

4. The charging and discharging scheduling method for electric vehicles accessing a microgrid under time-of-use according to claim 1, characterized in that, the step 5 comprises:

step 5.1, taking the output powers of the DG and the MT, an interactive power of the main grid and the microgrid, and an exchanged power of each EV with the microgrid in every moment, as one dimension of particle k, such that a number of the dimension T(n+3) of particle k is obtained;

step 5.2, initializing each parameter of a particle swarm optimization algorithm, wherein the parameters include: the total number M of particles, a number of iterations L, a maximum number of iterations $L_{max}$, speed updating parameters $c_1$ and $c_2$, $1 \leq L \leq L_{max}$, and initializing L=1;

step 5.3, determining an actual value of each constraint condition in the step 3 and the basic parameters in the step 4, and substituting them into the constraint conditions and objective functions of the particle swarm optimization algorithm, respectively;

step 5.4, producing an initial population, obtaining a position and speed of particle k of generation L, and modifying the position and speed of the particles according to the constraint conditions in the step 3;

step 5.5, calculating the fitness value of particle k in accordance with an objective function minC, and selecting a maximum fitness value among M particles of generation L as a group extreme value of generation L;

step 5.6, calculating respectively a position and speed of particle k of generation L+1 according to the position and speed of particle k of generation L, and modifying the position and speed of the particles according to the constraint conditions in the step 3, so as to obtain positions and speeds of M particles in a particle group of generation L+1;

step 5.7, recalculating the fitness value of particle k of generation L+1, and comparing it with the fitness value of particle k of generation L, selecting a larger fitness value as an individual extreme value of particle k of generation L+1; and selecting a maximum fitness value among the individual extreme values of M particles of generation L+1, as a group extreme value of generation L+1;

step 5.8, assigning L+1 to L, and judging whether $L<L_{max}$, if yes, proceeding to the step 5.6; otherwise stopping the iterations, and obtaining the group extreme value of generation $L_{max}$;

step 5.9, taking a scheduling solution corresponding to the group extreme value of generation $L_{max}$, as the optimal scheduling solution, such that the charge and discharge powers of the EV accessing the microgrid at different times under the constraint conditions are obtained.

\* \* \* \* \*